Sept. 25, 1934. C. GEBHARD 1,974,711
CUP AND BOWL COVER
Filed Feb. 3, 1933

Inventor
Carl Gebhard.
By Albert R. Dieterich
Attorney

Patented Sept. 25, 1934

1,974,711

UNITED STATES PATENT OFFICE 1,974,711

CUP AND BOWL COVER

Carl Gebhard, Los Angeles, Calif.

Application February 3, 1933, Serial No. 655,091

2 Claims. (Cl. 65—16)

This invention relates to a food cover particularly adapted for application to coffee cups, tea cups, and soup bowls to prevent the contents being spilled, and to retain the heat of the beverage, and also provides a hygienic covering to the food that prevents contamination by flies and dust.

My present invention is particularly designed as as improvement upon United States Patent No. 1,890,460 granted me on December 13th, 1932 for "Temporary cap for cups".

My invention is particularly designed for use in restaurants and other public eating places and provides a greater measure of cleanliness by preventing the spilling and slopping over of liquid foods when being carried.

An object of my invention is to provide a device of the kind described that can be instantly applied to cups and bowls without slowing up the service.

A further object of my invention is to provide a device of the character described at a minimum of cost suitable for all character of food dispensaries.

A still further object of my invention is to provide a device having enormous advertising possibilities, and one that is sure to be noticed and read by the customer.

My invention is not to be confused with the ordinary bottle cover or cap so commonly used that is fitted upon the inside of the bottle neck and requires a flange or shoulder to be properly seated, as my invention is not intended for application to the inside of the container but is fitted completely over the top of the cup or bowl and does not come into actual contact with the food contents except when the surface level is disturbed.

My invention is retained upon the cup or bowl by a turned inner flange having a measure of resiliency gripping the outer periphery of the cup or bowl with sufficient force to retain the cover in place.

My invention will be more readily understood by reference to the specifications and drawing accompanying and forming part of this application, and in which.

Figure 1:
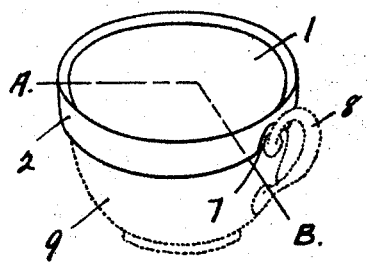
Figure 1 is an oblique view of the improved cover upon any ordinary drinking cup.
Figure 5:
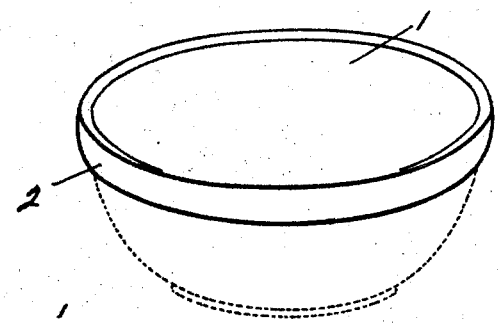
Figure 5 is an oblique view of the improved cover applicable to an ordinary soup or porridge bowl.

In the drawing like numerals indicate like parts and the numeral 1 indicates a disc member comprising a cover to a cup or bowl made of paper or other suitable material having a formed flange 2 comprising its outer periphery. The flange 2 may be formed in a variety of ways as shown in Figures 2, 6, and 7, but in all instances it is preferable to be an integral part of the disc member 1 on account of manufacturing costs and advantages, but it is not a necessity.

Figure 2:
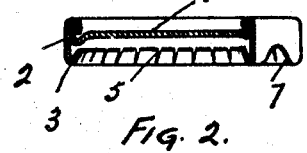
Figure 2 is a sectional elevation on a line A—B showing the general construction.
Figure 3:
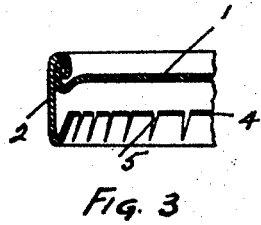
Figure 3 is an enlarged fragmentary sectional elevation showing the forming of the U-loop upon the lower edge of the flange.
Figure 4:
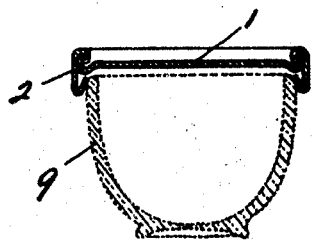
Figure 4 is a half sectional elevation showing the improved cover upon a half sectional elevation view of any ordinary drinking cup.
Figure 6:
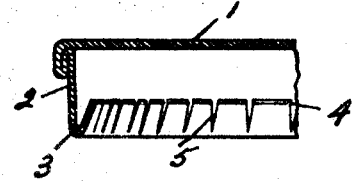
Figure 6 is an enlarged fragmentary sectional elevation of an alternative method of turning the rim.
Figure 7:
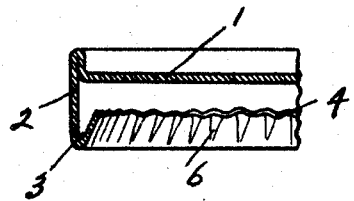
Figure 7 is likewise another alternative method of turning the rim or outer flange.

In the preferred form of construction of the cover shown in Figures 1 to 6 inclusive the lower edge of the flange 2 is shown turned inwardly and folded upwardly to comprise in section a U-loop 3 the inner and upper edge 4 of which may be split as at 5 and shown in Figures 2, 3, and 6, or the edge 4 may be crimped as at 6 in Figure 7, the sole object of the upturned split and crimped edge 4 being to provide a resilient gripping member adapted to retain the cover upon a cup or bowl.

In Figures 1 and 2, the cover is shown as having a portion of the flange removed at 7 to comprise a "cut out" to straddle the handle 8 of the cup 9 to which the cover is applied.

The upper face of the disc 1 provides a space upon which may be displayed advertising matter and provides a splendid medium for the prominent display of advertising copy.

The invention is economical to manufacture and offers many advantages in use in cleanliness and hygienic qualities besides being an efficient heat retainer.

Having now described my invention what I claim and desire to be protected in by Letters Patent, is:

1. In a food cover of the kind described the combination comprising, a disc member of suitable material, said disc member having a surrounding imperforate flange formed thereon substantially at right angles to said disc, the lower edge of said flange being turned inwardly and upwardly to comprise a U-loop, said upturned edge being split to comprise a series of resilient gripping members adapted to grip the outside periphery of a food container to which the cover may be applied to retain said cover upon said container.

2. A cup cover of the kind described comprising a disc and a cylindrical annulus, means permanently joining the disc and annulus together at the upper end of the annulus, said disc lying in a plane below that containing the upper edge of said annulus, the lower end of the annulus being slit and inturned to provide inwardly and upwardly projecting resilient fingers for the purpose specified.

CARL GEBHARD.